(12) United States Patent
Cheng

(10) Patent No.: US 9,365,230 B2
(45) Date of Patent: *Jun. 14, 2016

(54) FOLDING BABY STROLLER

(71) Applicant: Baby Jogger, LLC, Richmond, VA (US)

(72) Inventor: Chih-Ching Cheng, Yung Kang (TW)

(73) Assignee: Baby Jogger, LLC, Richmond, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/819,612

(22) Filed: Aug. 6, 2015

(65) Prior Publication Data

US 2015/0336599 A1 Nov. 26, 2015

Related U.S. Application Data

(63) Continuation of application No. 14/528,615, filed on Oct. 30, 2014, which is a continuation of application No. 13/645,981, filed on Oct. 5, 2012, now Pat. No. 8,899,613, which is a continuation of application No. 12/611,363, filed on Nov. 3, 2009, now Pat. No. 8,308,391, which is a continuation of application No. 11/118,621, filed on Apr. 28, 2005, now Pat. No. 7,632,035.

(60) Provisional application No. 60/567,325, filed on Apr. 30, 2004.

(51) Int. Cl.
*B62B 7/06* (2006.01)
*B62B 7/00* (2006.01)
*B62B 7/04* (2006.01)
*B62B 7/08* (2006.01)
*F16C 11/04* (2006.01)

(52) U.S. Cl.
CPC .............. *B62B 7/062* (2013.01); *B62B 7/008* (2013.01); *B62B 7/044* (2013.01); *B62B 7/08* (2013.01); *B62B 7/064* (2013.01); *B62B 2205/18* (2013.01); *B62B 2205/20* (2013.01); *B62B 2205/22* (2013.01); *F16C 11/04* (2013.01); *F16C 2326/20* (2013.01); *Y10T 74/18816* (2015.01); *Y10T 74/19651* (2015.01); *Y10T 403/32377* (2015.01)

(58) Field of Classification Search
CPC ...... B62B 7/062; B62B 7/08; B62B 2205/18; B62B 2205/20; F16H 35/00
See application file for complete search history.

(56) References Cited

U.S. PATENT DOCUMENTS

| | | | |
|---|---|---|---|
| 2,219,358 | A | 10/1940 | Economides |
| 3,471,892 | A | 10/1969 | Fussnegger |
| 3,961,497 | A | 6/1976 | Cohen |
| 3,972,563 | A | 8/1976 | Gustofasson |
| 4,412,688 | A | 11/1983 | Giordani |
| 4,524,890 | A | 6/1985 | Fulton |
| 4,544,178 | A * | 10/1985 | Al-Sheikh ............... B62B 7/062 280/642 |

(Continued)

FOREIGN PATENT DOCUMENTS

DE 19631776 A1 2/1998
EP 0894693 2/1999

*Primary Examiner* — Bryan Evans
(74) *Attorney, Agent, or Firm* — Sutherland Asbill & Brennan LLP

(57) ABSTRACT

A baby stroller for transporting a child is disclosed. This baby stroller has a folding mechanism to facilitate folding for easier stowing and transporting. The folding mechanism, a unique feature of the design is directed toward compactness, ease of use, reliability, and reduction in manufacturing costs.

18 Claims, 14 Drawing Sheets

(56) References Cited

U.S. PATENT DOCUMENTS

| | | |
|---|---|---|
| 5,056,805 A | 10/1991 | Wang |
| 5,257,799 A | 11/1993 | Cone |
| 5,590,896 A | 1/1997 | Eichhorn |
| 5,660,435 A | 8/1997 | Eichhorn |
| 5,669,624 A | 9/1997 | Eichhorn |
| 6,095,548 A | 8/2000 | Baechler |
| 6,102,431 A | 8/2000 | Sutherland |
| 6,105,998 A | 8/2000 | Baechler et al. |
| 6,698,300 B2 | 3/2004 | Swan |
| 6,789,848 B2 | 9/2004 | Rauschenberger |
| 6,869,096 B2 | 3/2005 | Allen et al. |
| 6,991,248 B2 | 1/2006 | Valdez |
| 7,632,035 B2 | 12/2009 | Kennedy |
| 2011/0084467 A1* | 4/2011 | Liao ........................ B62B 7/062 280/642 |

* cited by examiner

FOLDING BABY STROLLER

CROSS REFERENCE TO RELATED APPLICATIONS

This application claims priority as a continuation application to U.S. patent application Ser. No. 14/528,615 filed on Oct. 30, 2014, which claims priority as a continuation application to U.S. patent application Ser. No. 13/645,981 filed on Oct. 5, 2012, which claims priority as a continuation application to U.S. patent application Ser. No. 12/611,363 filed Nov. 3, 2009, which claims priority as a continuation application to U.S. patent application Ser. No. 11/118,621 filed on Apr. 28, 2005 which claims priority to non-provisional patent application to U.S. Provisional Patent Application No. 60/567,325 filed on Apr. 30, 2004, which are all incorporated by reference in their entirety.

BACKGROUND OF THE INVENTION

1. Field of the Invention

The present invention relates to baby strollers, and more particularly, to all-terrain baby strollers that can be folded.

2. Description of the Related Art

Traditionally, baby strollers have been used to push an infant slowly on a relatively hard smooth floor or sidewalk. As a result, the strollers were made small and light. These strollers work well enough at slow speed, but are extremely unwieldy and even dangerous on rough surfaces or at high speeds.

All-terrain baby strollers have been designed to overcome these problems. These strollers typically employ much larger wheels, often large bicycle tires. The stroller frame members are constructed of metal tubular stock and durable plastic frame connectors or other durable material to connect the frame members together to handle the heavy duty use they may receive. The frame connectors are used also to rotate or pivot one frame member relative to another, and are used to removably connect other frame members together.

Some advanced designs on all-terrain strollers have allowed for a certain degree of folding of the all-terrain baby strollers into less than a desirable amount of compactness. In addition, conventional folding mechanisms include complications that increase cost and reduce reliability and ease of use.

BRIEF SUMMARY OF THE INVENTION

The present invention resides in a folding baby stroller and a folding mechanism usable with a foldable baby stroller.

The folding mechanism includes a folding assembly having a first and second rotatable members rotatably mounted to rotate relative to each other. The first rotatable member is positioned for rotation in a first rotation plane and the second rotatable member is positioned for rotation in a second rotation plane, the first and second rotation planes being spaced apart. The first rotatable member has a first gear and the second rotatable member has a second gear. The folding assembly further has a third gear and a fourth gear configured to rotate together as a unit. The third gear is positioned in driving engagement with the first gear and the fourth gear is positioned in driving engagement with the second gear so that the first rotatable member and the second rotatable member rotate relative to each other in geared coordination. The first rotatable member is configured for attachment to a first one of first, second and third frame members, the second rotatable member being configured for attachment to a different second one of the first, second and third frame members, and the third and fourth gears configured for support by another different third one of the first, second and third frame members.

The first gear of the folding mechanism may have a first pitch and second gear a second pitch different than the first pitch, and the third gear may have a third pitch compatible with the first pitch of the first gear and the fourth gear may have a fourth pitch compatible with the second pitch of the second gear.

In one embodiment of the folding mechanism, the first rotatable member has a first aperture and the first gear is formed in a first edge portion of the first rotatable member defining the first aperture, and the second rotatable member has a second aperture and the second gear is formed in a second edge portion of the second rotatable member defining the second aperture. The third gear is positioned in the first aperture and the fourth gear is positioned in the second aperture. The first and second edge portions may be radially displaced from each other. Further, the first and second rotatable members each may have a face portion with the face portions arranged in face-to-face juxtaposition.

The first and second rotatable members may be rotatably mounted on a pivot member for rotation about a common axis of rotation, and the third and fourth gears may be coaxially mounted to rotate about an axis parallel to and spaced apart from the common axis of the first and second rotatable members.

In one embodiment of the folding mechanism the third gear has a first number of gear teeth and fourth gear has a second number of gear teeth different than the first number, and the third gear has a pitch compatible with the pitch of the first gear and the fourth gear has a pitch compatible with the pitch of the second gear.

The folding assembly may be used as part of a foldable baby stroller frame or other device. The baby stroller typically has a front wheel support, a rear wheel support and a handle member. The folding assembly may include a pivot member, a first rotatable member with a first aperture having a first gear, and a second rotatable member with a second aperture having a second gear. The first and second rotatable members are rotatably coupled to the pivot member to rotate about common axis of rotation. A third gear is positioned in both the first and second apertures in driving engagement with the first gear and the second gear so that the first rotatable member and the second rotatable member rotate relative to each other in geared coordination.

The first gear may have a first pitch and second gear a second pitch different than the first pitch, and the third gear may include a first gear portion with the first pitch and a second gear portion with the second pitch. The first and second portions of the third gear are configured to rotate as a unit. The first gear portion of the third gear is positioned in the first aperture in driving engagement with the first gear and the second gear portion of the third gear is positioned in the second aperture in driving engagement with the second gear.

The pivot member is configured to be supportingly engaged by one of the front wheel support, rear wheel support and handle member; the first rotatable member is configured to be attached to a different one of the front wheel support, rear wheel support and handle member; and the second rotatable member is configured to be attached to another different one of the front wheel support, rear wheel support and handle member.

The first gear is formed in a first edge portion of the first rotation member defining the first aperture and the second gear is formed in a second edge portion of the second rotation member defining the second aperture. In the depicted implementation the first and second edge portions are radially displaced from each other.

The first and second apertures may be elongated with the elongated first and second apertures at least in part overlapping. The first gear may have a first pitch diameter, and the second gear a second pitch diameter, with the first pitch diameter and the second pitch diameter not being the same. The first gear may be positioned radially outward of the second gear.

The depicted implementation has the first pitch diameter of the first gear sized to rotate the one of the front wheel support, rear wheel support and handle member to which the first rotatable member is configured to be attached through a first angle of rotation from a folded position to an unfolded position of the foldable baby stroller frame, and the second pitch diameter for the second gear is sized to rotate the one of the front wheel support, rear wheel support and handle member to which the second rotatable member is configured to be attached through a second angle of rotation from a folded position to an unfolded position of the foldable baby stroller frame, with the first and second angles of rotation not being the same.

The first rotatable member has an arm configured to be attached to the one of the front wheel support, rear wheel support and handle member to which the first rotatable member is configured to be attached, and the second rotatable member has an arm configured to be attached to the one of the front wheel support, rear wheel support and handle member to which the second rotatable member is configured to be attached.

The folding assembly may include a movable member, and the first and second rotatable members may each further include a notch to receive the member therein when the first and second rotatable members are rotated about the pivot member to position the notches of the first and second rotatable members in alignment.

The folding assembly may also include a housing in which the pivot member is positioned. The housing is configured to be attached to the one of the front wheel supports, rear wheel supports and handle members to which the pivot member is configured to be supportingly engaged.

Other features and advantages of the invention will become apparent from the following detailed description, taken in conjunction with the accompanying drawings.

DETAILED DESCRIPTION OF THE INVENTION

Figure 1:
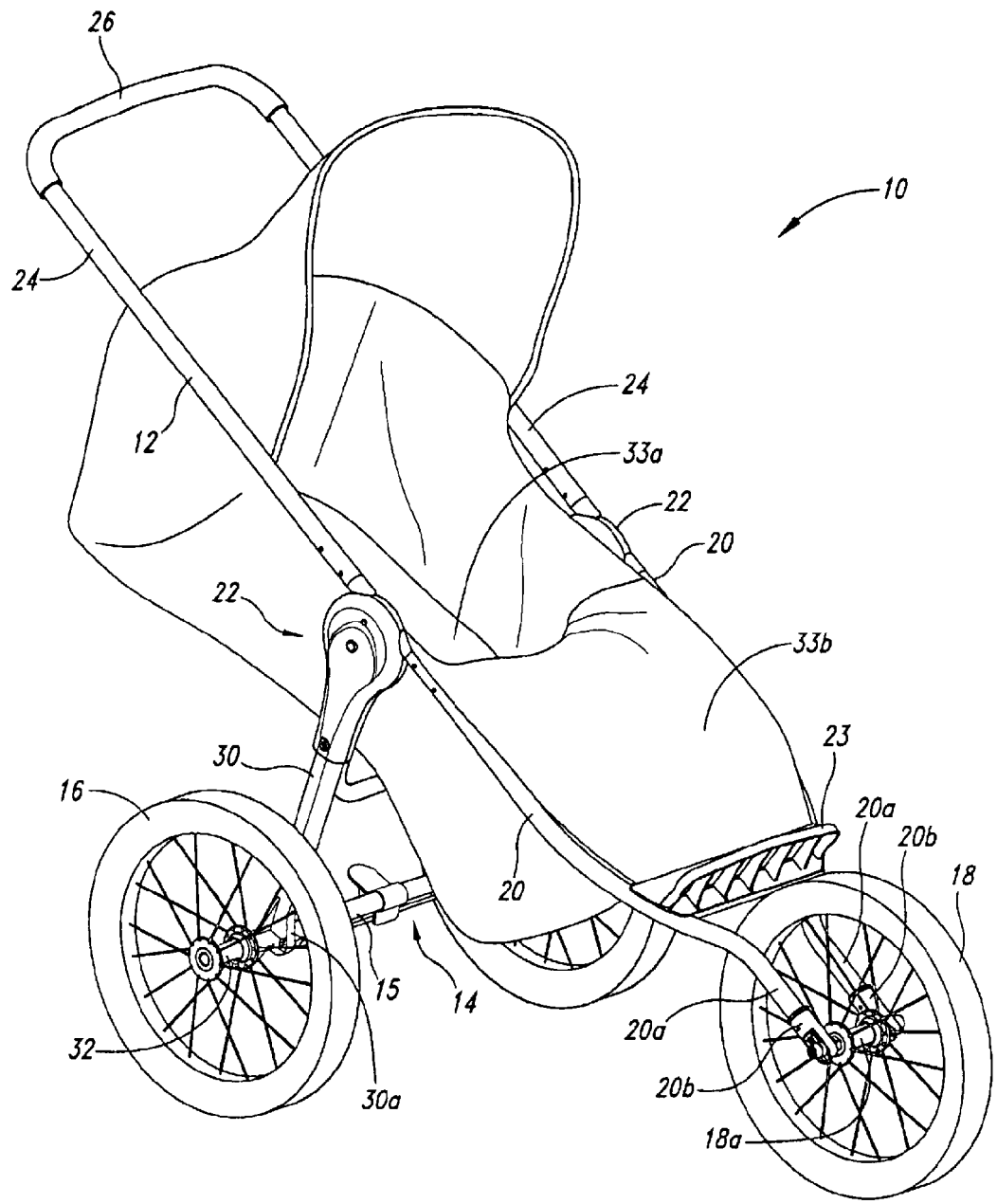
FIG. 1 is an isometric view of an exemplary implementation of a baby stroller embodying the present invention shown in a fully unfolded state ready for usage.

As shown in the drawings for purposes of illustration, the present invention is embodied in an all-terrain baby stroller 10, as shown in FIG. 1, having a foldable, tubular metal frame 12 and a transversely extending rear axle assembly 14 with a transverse, non-rotating tubular rear axle 15. Left and right side rear wheels 16 are rotatably mounted to the ends of the rear axle assembly 14. The forward end of the frame 12 has a single front wheel 18 rotatably mounted thereto.

The frame 12 has no base frame members extending rearwardly from the front wheel 18 to the rear axle assembly 14 as do most conventional all-terrain strollers. Instead, the frame 12 includes left and right side, downwardly and forwardly sloping front wheels frame members or supports 20, which each extend downward from a corresponding one of left and right side folding assemblies 22 in a converging configuration to the front wheel 18. A forward free-end 20a of each of the left and right side front wheel supports 20 has a plastic front wheel connector 20b fixedly attached thereto and a corresponding one of the left and right ends of an axle 18a of the front wheel 18 removably attached thereto to mount the front wheel to the stroller frame 12.

The front wheel supports 20 are interconnected by a foot rest 23 that spans between them toward but rearward of their forward free-ends 20a and that is fixedly attached to each at a position rearward of the axle 18a of the front wheel and extending partially over the front wheel 18. As a result of the interconnection provided by the foot rest 23, and also the front wheel 18 when attached to the left and right side front wheel connectors, the left and right side front wheel supports 20 form a stationary unit with respect to the left and right side folding assemblies 22 upon folding and unfolding of the stroller 10, as will be described in greater detail below.

The frame 12 also includes left and right side, upwardly and rearwardly sloping handle frame members or supports 24, which each extend upward from the corresponding one of the left and right side folding assemblies 22 in a generally parallel configuration to a handle 26 extending between the left and right side handle supports. The handle 26 is covered by a foam grip. The handle supports 24 are interconnected by the handle 26 that spans between them at their rearwardmost and uppermost extension and that is fixedly attached to each.

As a result of the interconnection provided by the handle 26, the left and right side handle supports 24 move as a unit with respect to the left and right side folding assemblies 22 upon folding and unfolding of the stroller 10, as will be described in greater detail below. It is noted that in lieu of the interconnecting handle 26, the handle supports 24 may each be provided with a handle portion at the upper end thereof such as used with umbrella style strollers.

In the illustrated embodiment of the invention the left and right side handle supports 24 and the handle 26 are formed as an integral unit by bending a single length of aluminum tube. The left and right side handle supports 24 are movable relative to the left and right side front wheel supports 20 for folding of the stroller 10 and do not together form an integrated rigid upper frame.

The frame 12 also includes left and right side, downwardly and rearwardly sloping rear wheel frame members or supports 30, which each extend downward from the corresponding one of the left and right side folding assemblies 22 in a generally parallel configuration to the rear axle assembly 14. A rearward free-end 30a of each of the left and right side rear wheel supports 30 is fixedly attached to the tubular rear axle 15 toward a corresponding one of the left and right ends of the tubular rear axle 15. The rear wheel supports 30 are interconnected by the rear axle assembly 14 that spans between them at the rearward free-ends 30a thereof. A cross-frame member 31 with a U-shape extends between the left and right side rear wheel supports 30. As a result of the interconnection provided by the rear axle assembly 14 and the cross-frame member 31, the left and right side rear wheel supports 30 move as a unit with respect to the left and right folding assemblies 22 for folding and unfolding of the stroller 10, as will be described in greater detail below. The left and right side rear wheel supports 30 are also movable relative to the left and right side front wheel supports 20 and the left and right side handle supports 24 for folding of the stroller 10. Further, the left and right side rear wheel supports 30 and the rear axle assembly 14 connected thereto do not form a part of a base frame extending between the rear and front wheels 16 and 18. Much of the structural strength of the stroller 10 and the interconnection of the front wheel supports 20, the handle supports 24, and the rear wheel supports 30 are provided by the centrally positioned left and right side folding assemblies 22, and not by a base frame.

In the illustrated embodiment of the stroller 10, the left and right side front wheel supports 20, the left and right side handle supports 24, and the left and right side rear wheel supports 30 are made from aluminum tube. Suitable alternative materials may be used.

The left and right outward ends of the tubular rear axle 15 are open and internally threaded to receive a threaded stub axle 32 forming a part of the corresponding one of the left and right rear wheels 16. A lock nut (not shown) when tightened against the face of the stub axle 32 locks the stub axle against loosening during usage of the stroller 10. Alternative constructions may be used to fixedly or removably attach the rear wheels 16 to the tubular rear axle 15, and any suitable alternative manner of mounting the rear wheels 16 to the real wheel supports 30 may be used.

Figure 2:
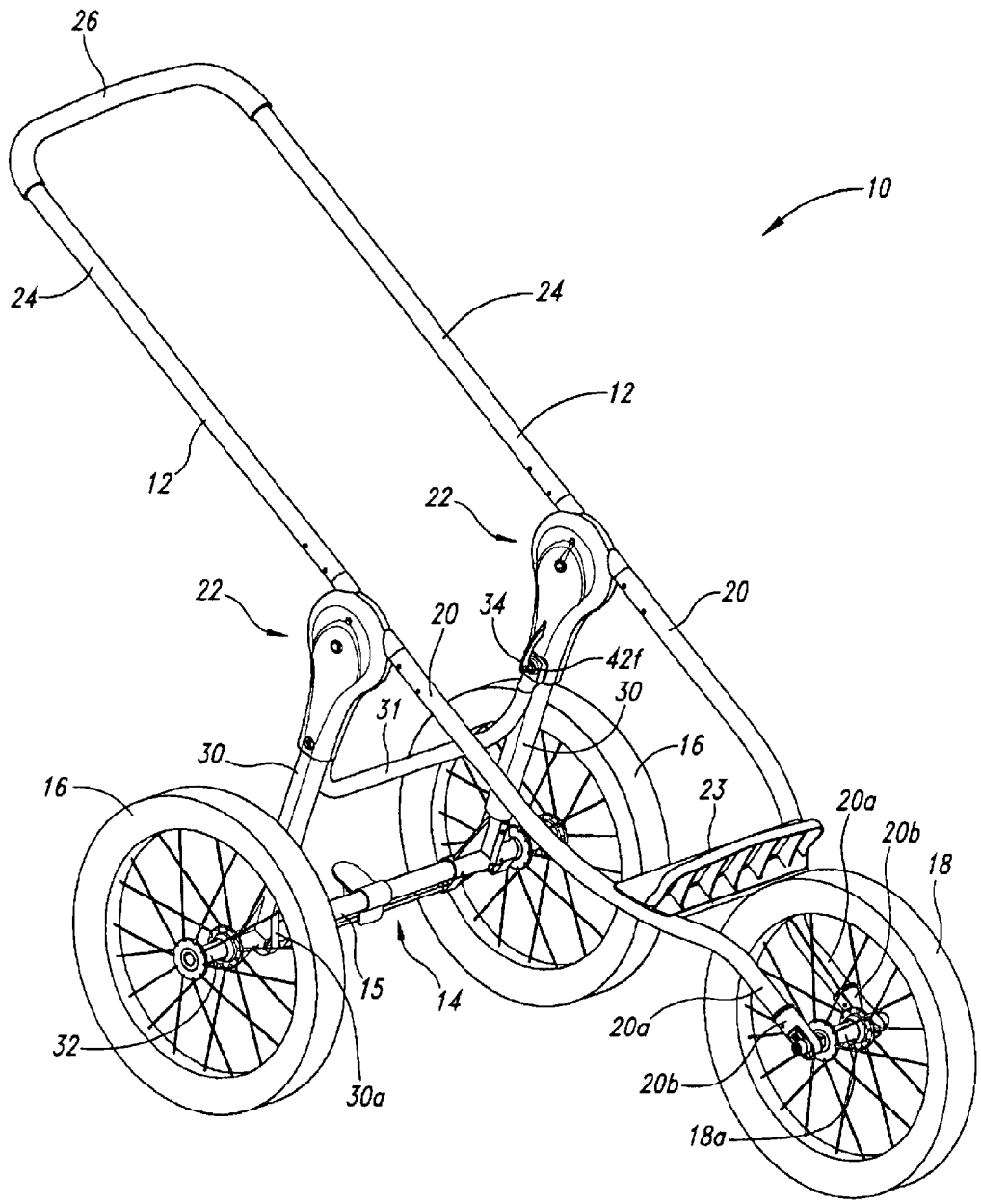
FIG. 2 is an isometric view of the stroller frame of FIG. 1 without a seat and a leg guard.

The frame 12 of the stroller 10 is shown in FIG. 1 in the fully unfolded state with a fabric seat 33a, and a fabric leg support and guard 33b. The seat 33a is suspended from the left and right side handle supports 24, and the leg guard 33b spans between and is supported by the left and right side front wheel supports 20. For purposes of illustration, the frame 12 is shown in FIG. 2 without the seat 33a and the leg guard 33b.

Figure 3:
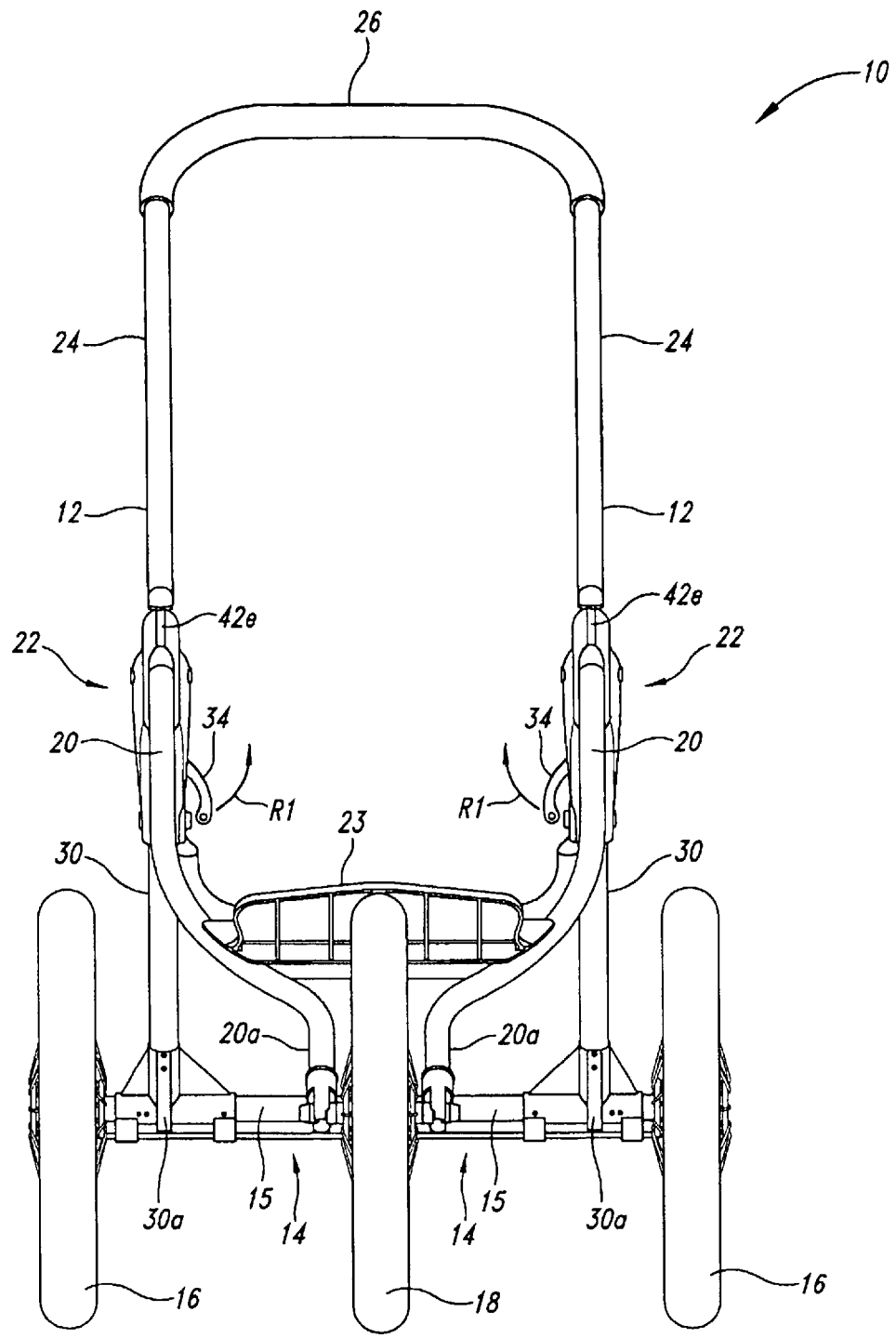
FIG. 3 is a front elevational view of the stroller frame of FIG. 2.

For the depicted implementation, user operation of the left and right side folding assemblies 22 will now be described. The left and right side folding assemblies 22 have the same construction, with one being the mirror image of the other, and the description below, while in the singular, is applicable to both. Each of the left and right rear wheel supports 30 supports an inwardly extending lever 34, which has a predominantly vertical orientation, as shown in FIG. 3, when the frame 12 of the stroller 10 is locked in the fully unfolded position. To begin the procedure to fold the frame 12, each of the levers 34 is pulled upward and inward as depicted by arrows R1 to thereby put the left and right side folding assemblies 22 in an unlocked state as further explained below. A strap (not shown) may be connected by its ends to the levers 34 to facilitate movement of both levers at the same time.

Figure 4:
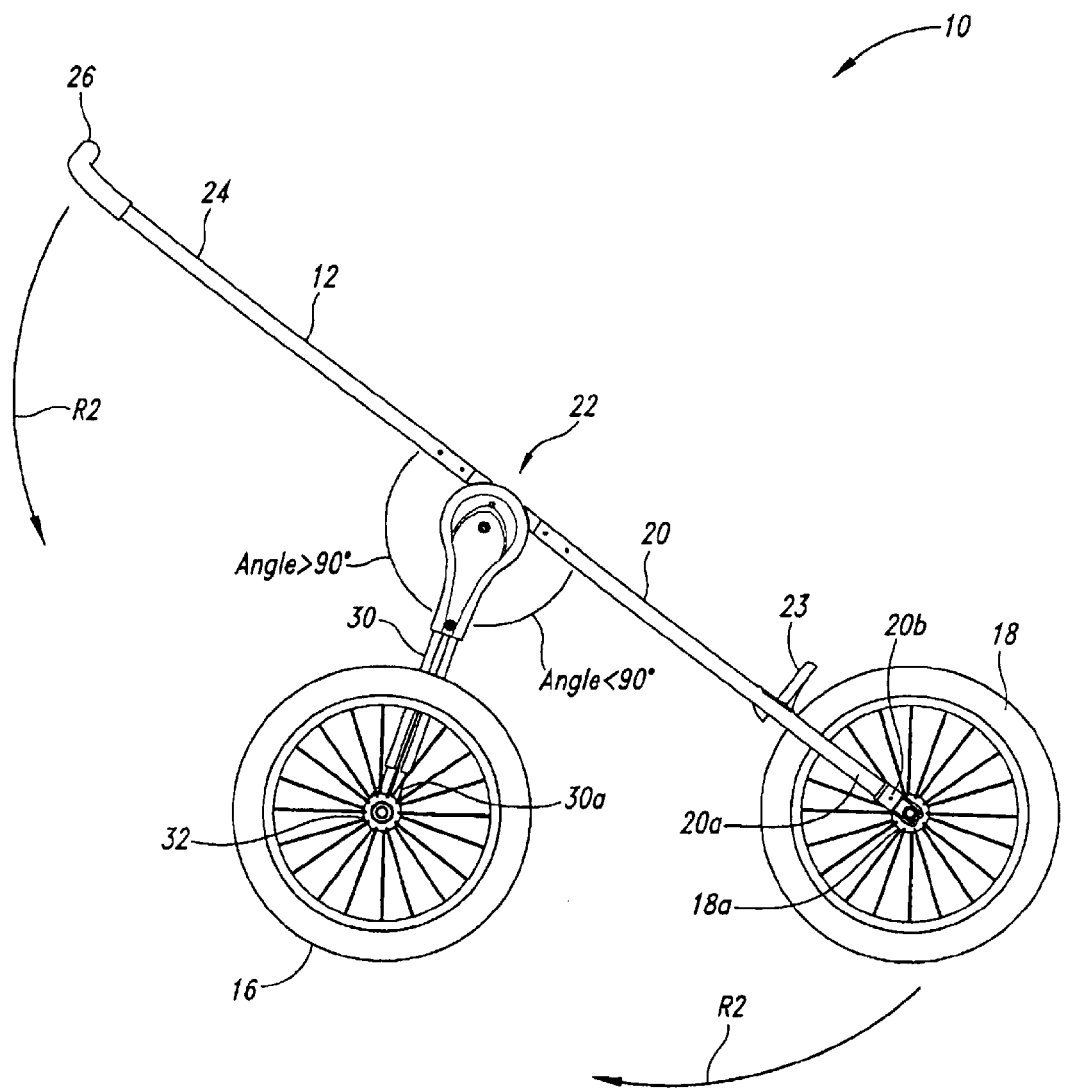
FIG. 4 is a side elevational view of the stroller frame of FIG. 2.
Figure 5:
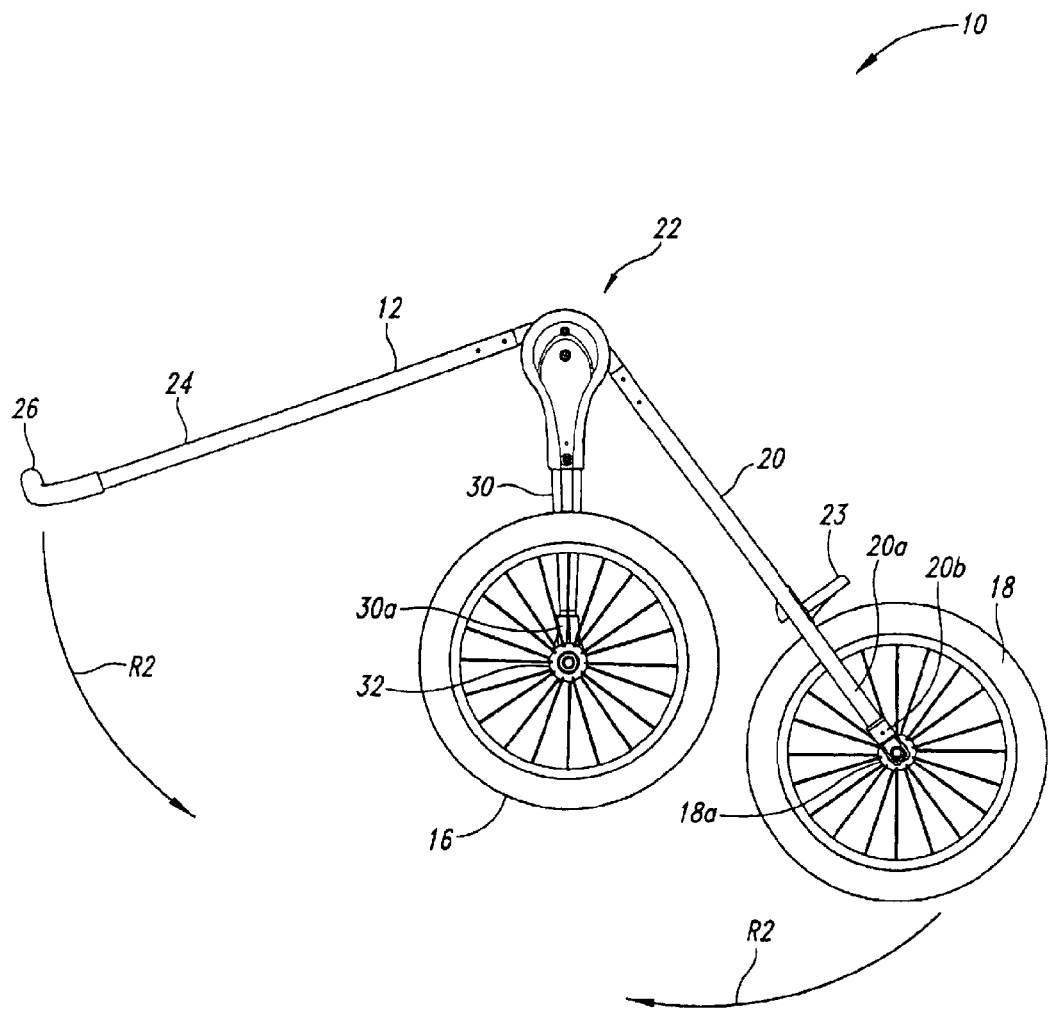
FIG. 5 is a side elevational view of the stroller frame of FIG. 2 shown in the partially folded state.
Figure 6:
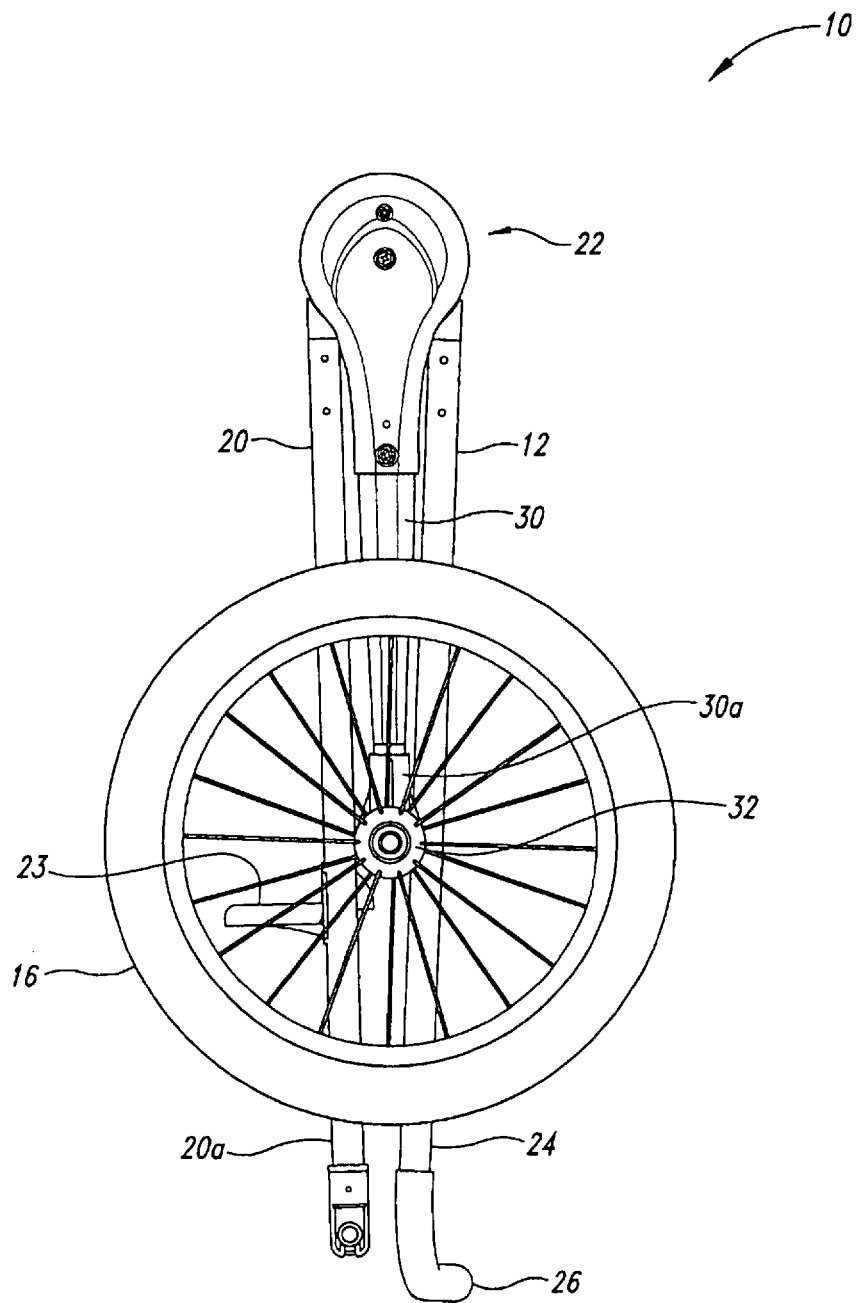
FIG. 6 is a side elevational view of the stroller frame of FIG. 2 shown in a fully folded state with both left and right front supports and left and right side handle supports being rotated about their respective side folding assemblies toward respective side rear wheel supports and with the front wheel removed.

With each of the left and right folding assemblies 22 in an unlocked state, the left and right handle supports 24, along with the handle 26, and the left and right front wheel support 20, along with the front wheel 18, can be rotated about the left and right folding assemblies, respectively, toward the left and right rear wheel supports 30, respectively, as depicted by arrows R2 shown in FIG. 4. As shown, when the stroller 10 is folded, the folding assemblies 22 allow a greater rotation angle for the handle supports 24 (greater than 90°) than for the front wheel supports 20 (less than 90°). As explained further below, the front wheel supports 20 move in geared coordination with movement of the handle supports 24. As the frame 12 is being folded, the front wheel supports 20 are rotated clockwise about the folding assemblies 22 as viewed in FIG. 4, while the handle supports 24 are also rotated counterclockwise about the folding assemblies as viewed in FIG. 4. The frame 12 is shown in a partially folded state in FIG. 5. In a fully folded state, both the front wheel supports 20 and the handle supports 24 have been rotated in geared coordination with each other about the folding assemblies 22 to be positioned in close proximity to the rear wheel supports 30 as shown in FIG. 6. To do so the front wheel 18 is removed.

Figure 7:
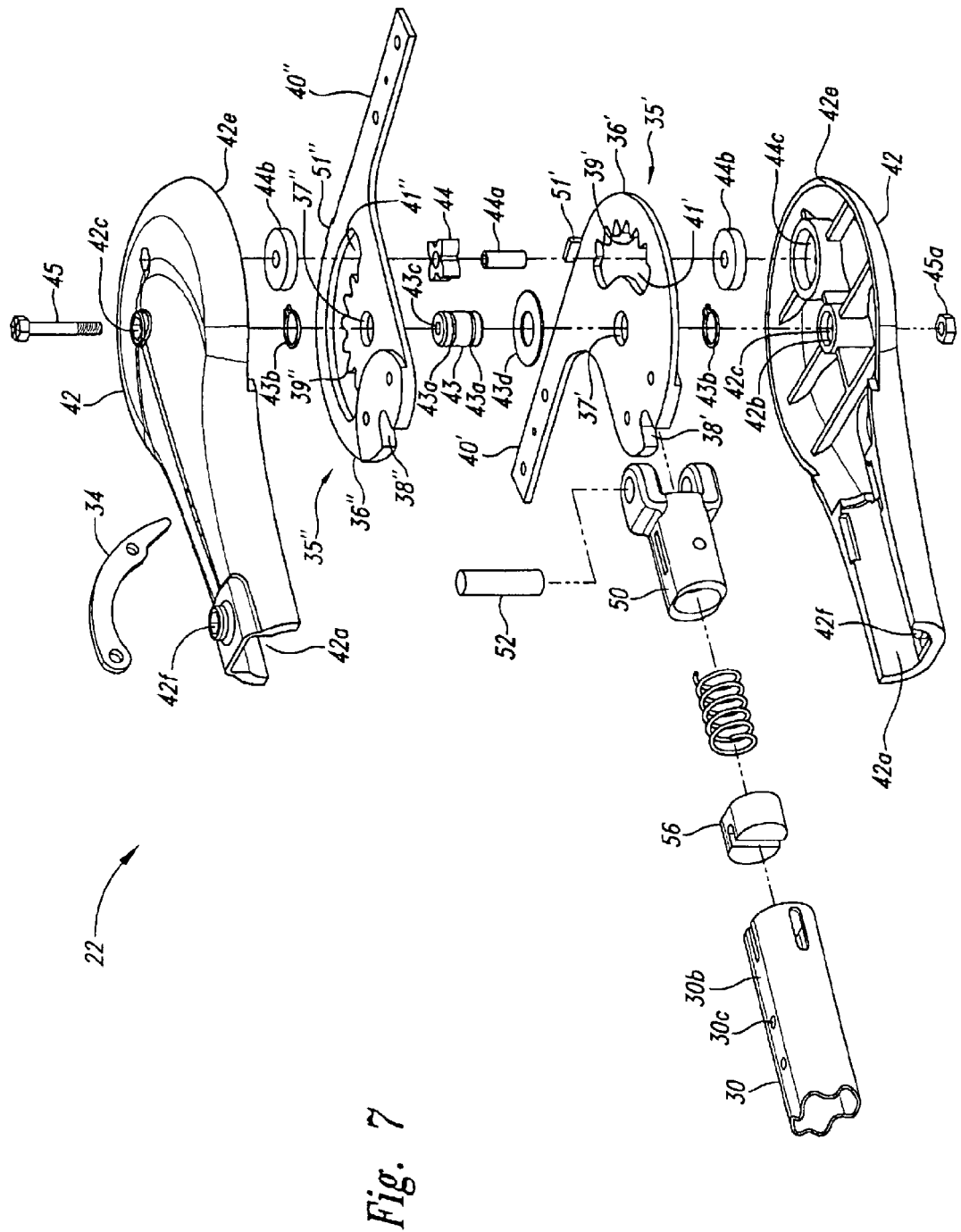
FIG. 7 is an exploded isometric view of the right side folding assembly of the implementation shown in FIG. 1, the left side folding assembly being a mirror image thereof.

The right side folding assembly 22 is shown in exploded view in FIG. 7 and includes a laterally outward positioned forward rotatable member 35' and a laterally inward rearward rotatable member 35", each with a flat face facing toward the other. The forward rotatable member 35' has a plate or disk 36' with a central plate portion having a central aperture 37'. The forward rotatable member 35' also includes a notch 38', a radially outward internal gear 39' in an elongated aperture 41', and an arm 40'. The rearward rotatable member 35" has a plate or disk 36" with a central plate portion having a central aperture 37". The rearward rotatable member 35" also includes a notch 38", a radially inward internal gear 39" in an elongated aperture 41", and an arm 40". For each of the rotatable members 35' and 35", the disks 36' and 36" and the arms 40' and 40" are depicted as being formed as part of a single flat plate piece; however, in other implementations the disks and arms are individual pieces that are fixedly attached together.

The rotatable members 35' and 35", along with a corresponding one of the rear wheel supports 30, are contained between inner and outer slotted halves of a housing 42 that allow the arms 40' and 40" to protrude outside of the housing. The inside wall of each half of the housing 42 has a recess 42a sized and shaped such that when the two halves of the housing are positioned together, the recesses form a cavity to receive an upper free-end portion 30b of the corresponding rear wheel support 30 therein and an upper free-end portion of the cross-frame member 31. A bolt (not shown) extends through an aperture 42f in each half of the housing 42 and through an aperture 30c in the upper free-end portion 30b of the rear wheel support 30 and an aperture of the upper free-end portion of the cross-frame member 31 to securely clamp the rear wheel support and the cross-frame member between the inner and outer halves of the housing.

The central apertures 37' and 37" of the disks 36' and 36", respectively, are sized to receive a bushing 43 therethrough having a length longer than the cumulative thickness of the two disks. The rotatable members 35' and 35" are rotatably mounted on the bushing for rotation within the housing 42 in parallel rotation planes about an axis of rotation transverse to the plane of the disks 36' and 36". The end portions of the bushing extending beyond the central apertures 37' and 37" each have a circumferential groove 43a to receive a C-clip 43b to retain the bushing 43 in place. The bushing 43 also extends through a washer 43d positioned between the disks 36' and 36" of the rotatable members 35' and 35" to serve as a spacer and bearing surface for rotational movement of the rotatable members about the bushing 43. Each of the disks 36' and 36" has a flat face in face-to-face juxtaposition with the flat face of the other disk with the washer 43d positioned therebetween.

The end portions of the bushing 43 extending beyond the C-clip 43b are each positioned in and retained by a retaining cup 42b formed by the inside wall of a correspondingly positioned one of the inner and outer halves of the housing 42. Each of the inner and outer halves of the housing 42 has an aperture 42c in communication with the corresponding retaining cups 42b. The bushing 43 has a longitudinally extending central aperture 43c aligned with apertures 43b of inner and outer halves of the housing 42, and sized to receive a bolt 45 therethrough that extends fully through the inner and outer halves of the housing. A nut 45a is threaded onto a threaded end portion of the bolt 45 to clamp the inner and outer halves of the housing 42 of the folding assembly 22 securely together with the disks 36' and 36" freely rotatable on the bushing 43 and being spaced apart by the washer 43d, and with the arm 40' extending forwardly through a forward portion of a slot 42e in the housing and the arm 40" extending rearwardly through a rearward portion of the housing slot. The arms 40' and 40" are flat elongated plates.

As noted above, the disks 36' and 36" of the rotatable members 35' and 35" have their flat faces in face-to-face juxtaposition. This provides laterally adjacent parallel plates with elongated apertures 41' and 41", each having the gear teeth of a corresponding one of the radially outward and inward gears 39' and 39" formed along an edge portion of the corresponding one of the elongated apertures 41' and 41". The gear teeth of the radially outward gear 39' of the disk 36' are formed along the radially outward edge of the elongated aperture 41', and the gear teeth of the radially inward gear 39" of the disk 36" are formed along the radially inward edge of the elongated aperture 41". The planar disks 36' and 36" are arranged in spaced apart parallel planes, and the radially outward and inward gears 39' and 39" are similarly arranged in spaced apart parallel planes and not in a common plane or in direct engagement with each other. The elongated apertures 41' and 41" are positioned on the disks 36' and 36" so as to be at least in part overlapping during the rotation of the rotatable members 35' and 35" between the folded and unfolded states of the stroller 10.

A pinion gear 44 is positioned within the elongated apertures 41' and 41" in simultaneous geared engagement with both the radially outward gear 39' of the forward rotatable member 35' and the radially inward gear 39" of the rearward rotatable member 35". The pinion gear 44 is positioned to extend through and beyond each of the elongated apertures 41' and 41" of the disks 36' and 36" at a position where the elongated apertures overlap during folding and unfolding of the stroller 10, and span fully between the radially outward and inward gears 39' and 39" of the disks 36' and 36" in simultaneous geared engagement with both of the gears. The pinion gear 44 transmits the driving rotational force between the front wheel supports 20 and the handle supports 24 which causes one to rotate in response to rotation of the other.

The pinion gear 44 is rotatably mounted on a pin 44a that has each of its end portions extending beyond the pinion gear 44 positioned in the aperture of a flat bushing 44b and rotatably retained by the flat bushing. Each of the flat bushings 44b is positioned in and retained by a retaining cup 44c formed by the inside wall of a correspondingly positioned one of the inner and outer halves of the housing 42. As such, the pinion gear 44 is supported by the housing 42, which is rigidly attached to the corresponding one of the rear wheel supports 30 for movement therewith, of course, being rotatable about the axis of the pin 44a. With such arrangement, the pinion gear 44 is rotatable about an axis of rotation transverse to the plane of the disks 36' and 36", and parallel to and spaced apart from the axis of rotation of the disks 36' and 36".

The pinion gear 44 engages both the radially outward gear 39' of the forward rotatable member 35' and the radially inward gear 39" of the rearward rotatable member 35". Consequently, through the pinion gear 44, the radially outward gear 39' and the radially inward gear 39" are mutually drivingly engaged with each other so that if either is rotated, the rotational force is transmitted through the pinion gear to the other to cause the other to also rotate about the bushing 43. As such, if the front wheel supports 20 or the handle supports 24 are rotated relative to the rear wheel supports 30, the other of the front wheel supports and the handle supports is driven to rotate as well.

The radially outward and inward gears 39' and 39" have the same pitch since the pinion gear 44 engages both, but each has a larger pitch diameter than the pinion gear. However, the radially inward gear 39" have a smaller radius of curvature or pitch diameter than the radially outward gear 39', thus the resulting' rotational movement of the rearward rotatable member 35" will be greater than the rotational movement of the forward rotatable member 35'. In other words, for any amount the pinion gear 44 is rotated, the rearward rotatable member 35" and hence the handle support 24 attached thereto will rotate more than the forward rotatable member 35" and hence the front wheel support 20 attached thereto. This is useful since as noted above, and as shown in FIG. 4, to fold the front wheel supports 20 and the handle supports 24 tightly about the rear wheel supports 30 requires a greater rotation angle for the handle supports (in one embodiment about) 108° than for the front wheel supports (in that same embodiment about 72°). In another embodiment the rotation angle for the handle supports and the front wheel supports is the same (in the second embodiment about 90° for each).

The pitch diameter for each of the radially outward gear 39' of the forward rotatable member 35' and the radially inward gear 39" of the rearward rotatable member 35", and the pitch diameter of the pinion gear 44, are selected to produce the desired ratio of rotational movement for the forward and rearward rotatable members 35' and 35" to fold the stroller 10 into a compact form with the handle supports 24 and the front wheel supports 20 nested tightly against the rear wheel supports 30. However, while the ability to select different pitch diameters for the radially outward and inward gears 39' and 39" is helpful, even a greater degree of design flexibility may be desirable.

Figure 10:
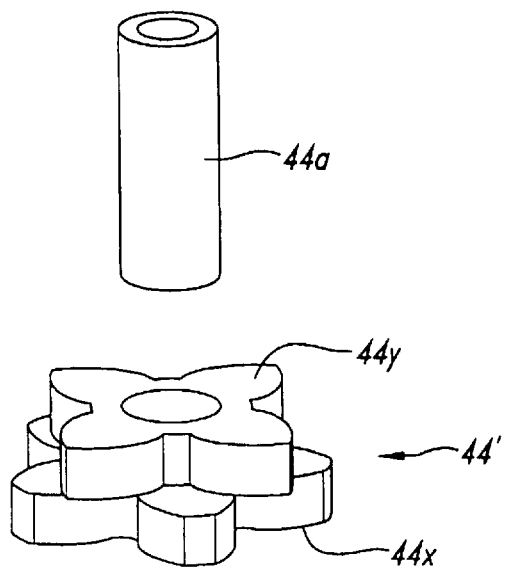
FIG. 10 is an enlarged isometric view of a pinion gear and pin used in an alternative embodiment of the folding assembly shown in FIG. 12 where the pinion gear has two gear portions.
Figure 12:
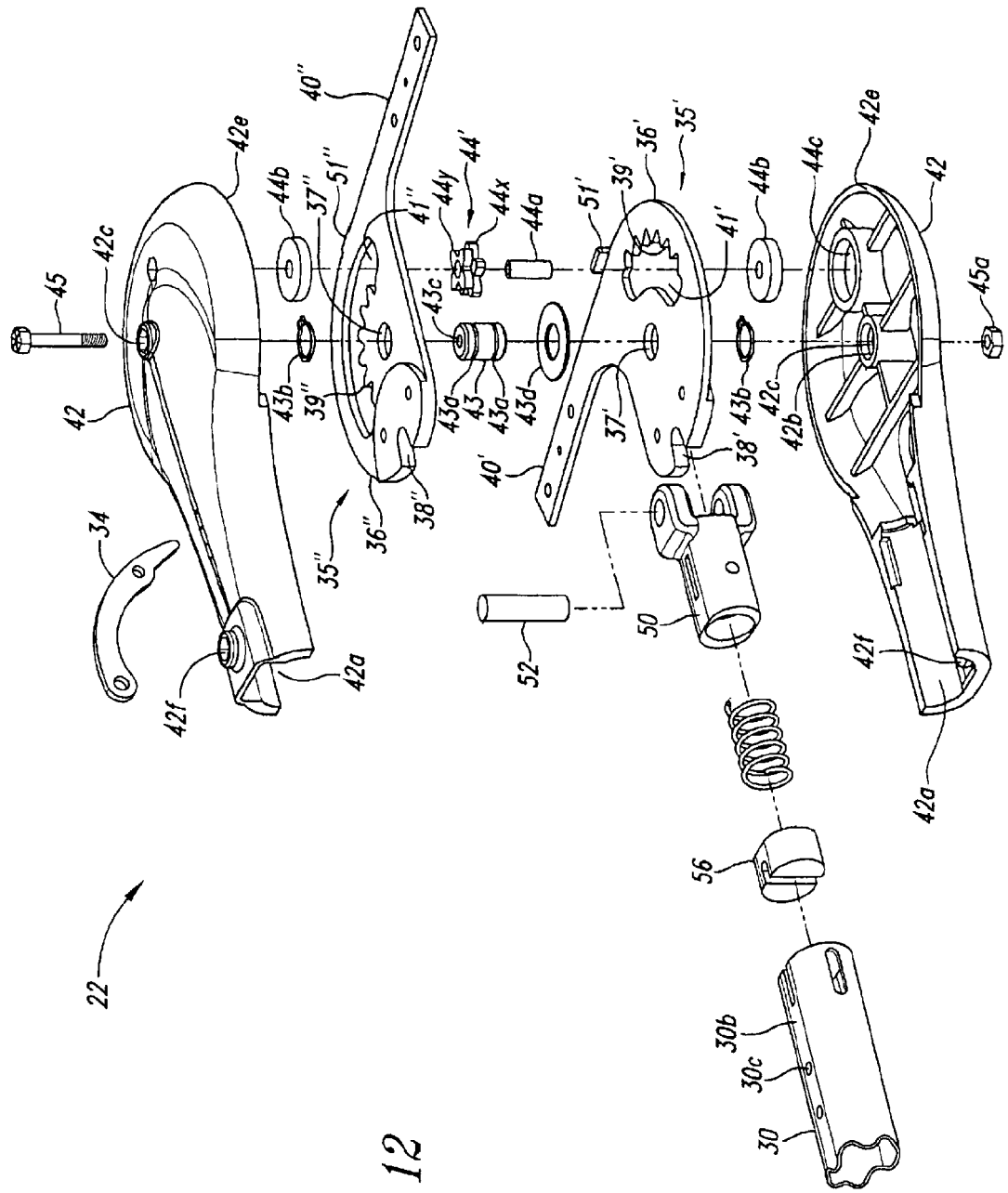
FIG. 12 is an exploded isometric view, corresponding to FIG. 7, of the right side folding assembly of an alternative embodiment of the folding assembly, the left side folding assembly being a mirror image thereof.

In another embodiment of the folding assembly 22 shown in FIGS. 10 and 12, a pinion gear 44' is shown having first and second pinion gear portions 44x and 44y, with the first pinion gear portion having a first pitch, a first pitch diameter and a first number of gear teeth, and the second pinion gear portion having a different second pitch, a second pitch diameter and a different second number of gear teeth. The first and second pinion gear portions 44x and 44y are made as a single part and rotate together as a unit in coaxial arrangement on the pin 44a, but are essentially two pinion gears, each with its own gear parameters. The first pinion gear portion 44x is positioned to engage the radially outward gear 39' and has a pitch corresponding thereto and five gear teeth, and the second pinion gear portion 44y is positioned to engage the radially inward gear 39" and has a pitch corresponding thereto and four gear teeth. The first and second pinion gear portions 44x and 44y may have the same or different pitch diameters. In such manner, the radially outward and inward gears 39' and 39" and the first and second pinion gear portions 44x and 44y that engage them, respectively, may be designed with gear parameters to produce a wider range of differing amounts of rotational movement of the forward and rearward rotatable members 35' and 35" when folding and unfolding the stroller 10. In effect, there is more design freedom and flexibility permitted since the radially outward gear 39' and the first pinion gear portion 44x pair can be designed with first gear parameters to produce a first rotational movement of the forward rotatable member 35', and the radially inward gear 39" and the second pinion gear portion 44y pair can be designed with different second gear parameters to produce a different second rotational movement of the rearward rotatable member 35", with independence in the first and second gear parameters selected.

As noted above, with the first embodiment described only the pitch diameters of the radially outward and inward gears 39' and 39" differed, but in the embodiment of FIGS. 10 and 12, the radially outward gear 39' and the first pinion gear portion 44x pair and the radially inward gear 39" and the second pinion gear portion 44y pair can be designed essentially independent of the other to produce a desired result, such as a desired ratio of rotational movement of the radially outward gear 39' and the radially inward gear 39", and hence the desired ratio of rotational movement of the forward and rearward rotatable members 35' and 35" when folding and unfolding the stroller 10. For example, this permits design of the folding assemblies 22 with more control over the amount of movement of both the handle supports 24 and the front wheel supports 20 relative to the rear wheel supports 30 resulting during folding of the stroller 10 and hence allows folding into a compact form where the handle supports and the front wheel supports can be moved to nest tightly against the rear wheel supports.

Figure 11:
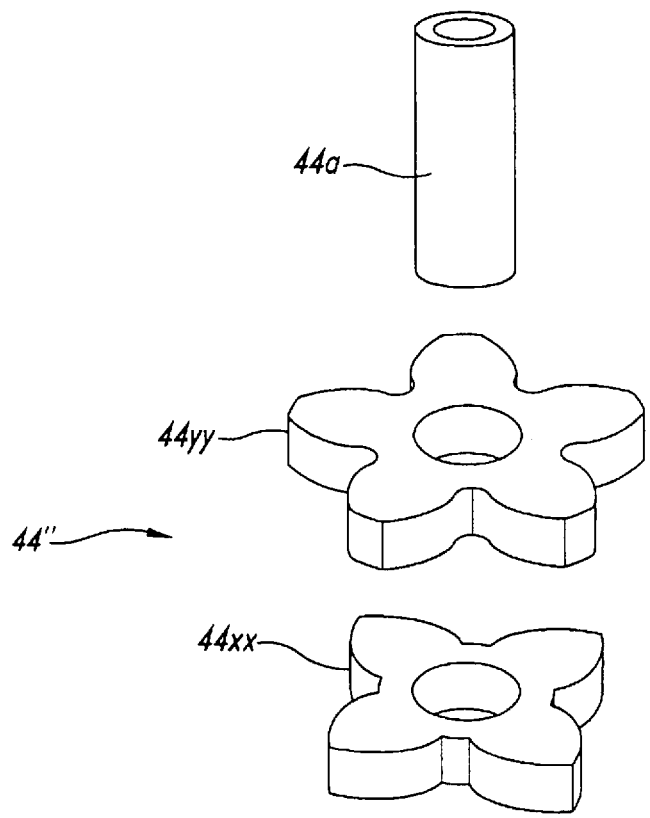
FIG. 11 is an enlarged isometric view of a pinion gear and pin used in yet another alternative embodiment of the folding assembly shown in FIG. 13 where the pinion gear is comprised of two gears affixed together for use.
Figure 13:
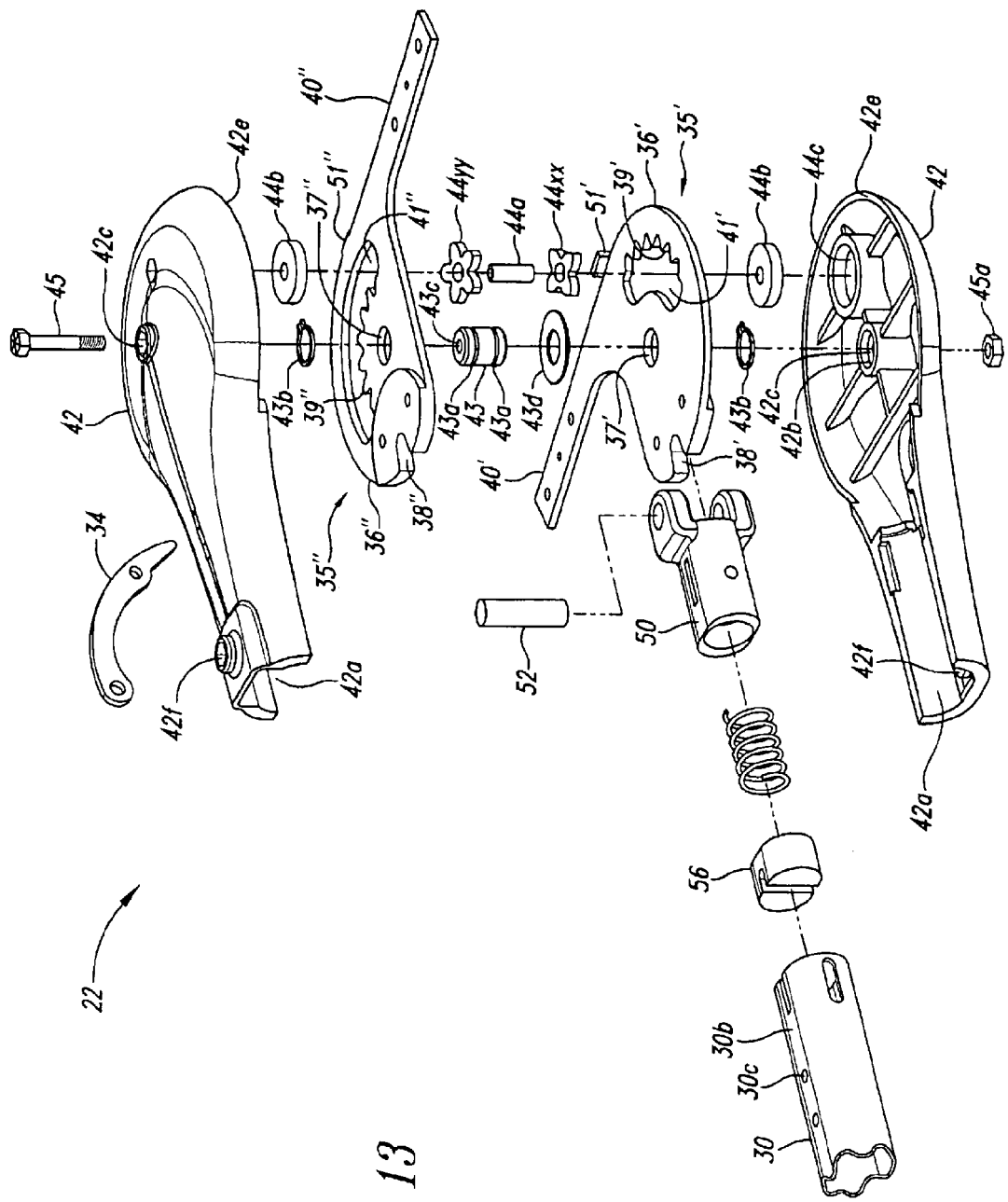
FIG. 13 is an exploded isometric view, corresponding to FIG. 7, of the right side folding assembly of yet another alternative embodiment of the folding assembly, the left side folding assembly being a mirror image thereof.

In yet another embodiment of the folding assembly 22 shown in FIGS. 11 and 13, a pinion gear 44" is shown having first and second pinion gears 44xx and 44yy made as separate parts but fixedly attached together for rotation together as a unit on the pin 44a, such as by welding, an insertion pin or some other manner. Alternatively, the first and second pinion gears 44xx and 44yy may be keyed to the pin 44a so long as the pin is free to rotate. The first pinion gear 44xx has a first pitch, a first pitch diameter and a first number of gear teeth (shown as five in this embodiment), and the second pinion gear 44yy has a different second pitch, a second pitch diameter and a different second number of gear teeth (shown as four in this embodiment). The first pinion gear 44xx is positioned to engage the radially outward gear 39', and the second pinion gear 44yy is positioned to engage the radially inward gear 39". As above, the radially outward gear 39' and the first pinion gear 44xx pair and the radially inward gear 39" and the second pinion gear 44yy pair can be designed with gear parameters essentially independent of the other to providing greater flexibility in designing the folding assemblies 22 to produce a desired ratio of rotational movement of the radially outward gear 39' and the radially inward gear 39", and hence the desired ratio of rotational movement of the forward and rearward rotatable members 35' and 35" when folding and unfolding the stroller 10.

Figure 8:
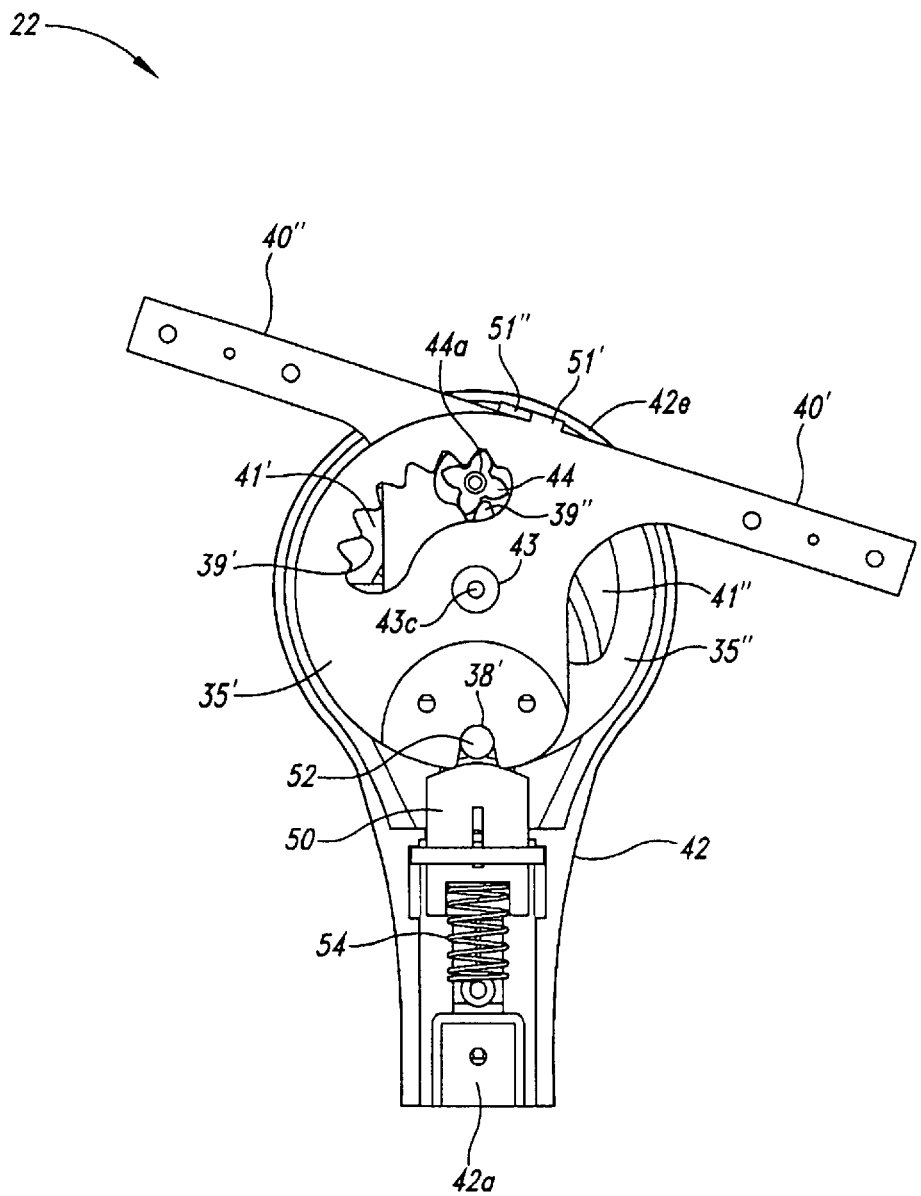
FIG. 8 is an enlarged, fragmentary, right side elevational view of the right side folding assembly of FIG. 7 with its outer half housing removed and in the fully unfolded state.

The length of the radially outward gear 39' of the forward rotatable member 35' and the radially inward gear 39" of the rearward rotatable member 35", and also the length of the elongated apertures 41' and 41" within which the pinion gear 44 is positioned, impact the amount of rotation possible for the forward and rearward rotatable members 35' and 35". The range of movement is limited by stops 51' and 51" attached to the perimeter portion of the forward and rearward rotatable members 35' and 35", respectively. Each of the stops 51' and 51" extends laterally toward the adjacent rotatable member and radially outward of the perimeter of the adjacent rotatable member. The stops 51' and 51" are attached to the rotatable members 35' and 35" at positions along the perimeter of the rotatable member to which attached such that when the rotatable members are rotated to place the folding assemblies 22 in the fully unfolded state, as shown in FIG. 8, the stops 51' and 51" are in engagement and prevent further rotational movement of the rotatable members in that rotational direction. In the depicted implementation, the stops 51' and 51" are positioned to allow a rotation angle for the handle supports 24 of about 108° and for the front wheel supports 20 of about 70°.

It should be understood that while in the depicted implementation the front wheel supports 20 and the handle supports 24 are attached to the rotatable members 35' and 35" of the left and right side folding assemblies 22 (and the rear wheel supports 30 fixedly attached to the housing 42), other implementations may have the rear wheel supports 30 and the handle supports 24 attached to the rotatable members 35' and 35" of the folding assemblies 22 (and the front wheel supports 20 fixedly attached to the housing 42) such that they rotate to fold about the front wheel supports. Similarly, the rear wheel supports 30 and the front wheel supports 20 may be attached to the rotatable members 35' and 35" of the folding assemblies 22 (and the handle supports 24 fixedly attached to the housing 42) such that they rotate to fold about the handle supports.

To prevent the unintended folding of the stroller 10 when the folding assemblies 22 are in a fully unfolded state, as shown in FIG. 8, each folding assembly has a releasable locking mechanism with a slidably mounted head 50 having a locking lug 52. A spring 54 applies a bias force to the head 50 to maintain the locking lug 52 in contact with a smooth, rounded perimeter portion of each of the disks 36' and 36" of the folding assembly as the rotatable members are rotated close to the stroller fully unfolded state. The notches 38' and 38" of the disks 36' and 36" are positioned along a reinforced perimeter portion of the disks in a location where when the stroller 10 reaches the fully unfolded state, the notches are in alignment and the spring 54 will drive the head 50 forward to position the locking lug 52 in both notches, and hence prevent rotation of the disks toward the folded state. The portion of the disks 36' and 36" around the notches 38' and 38" has increased thickness for added strength.

Figure 9:
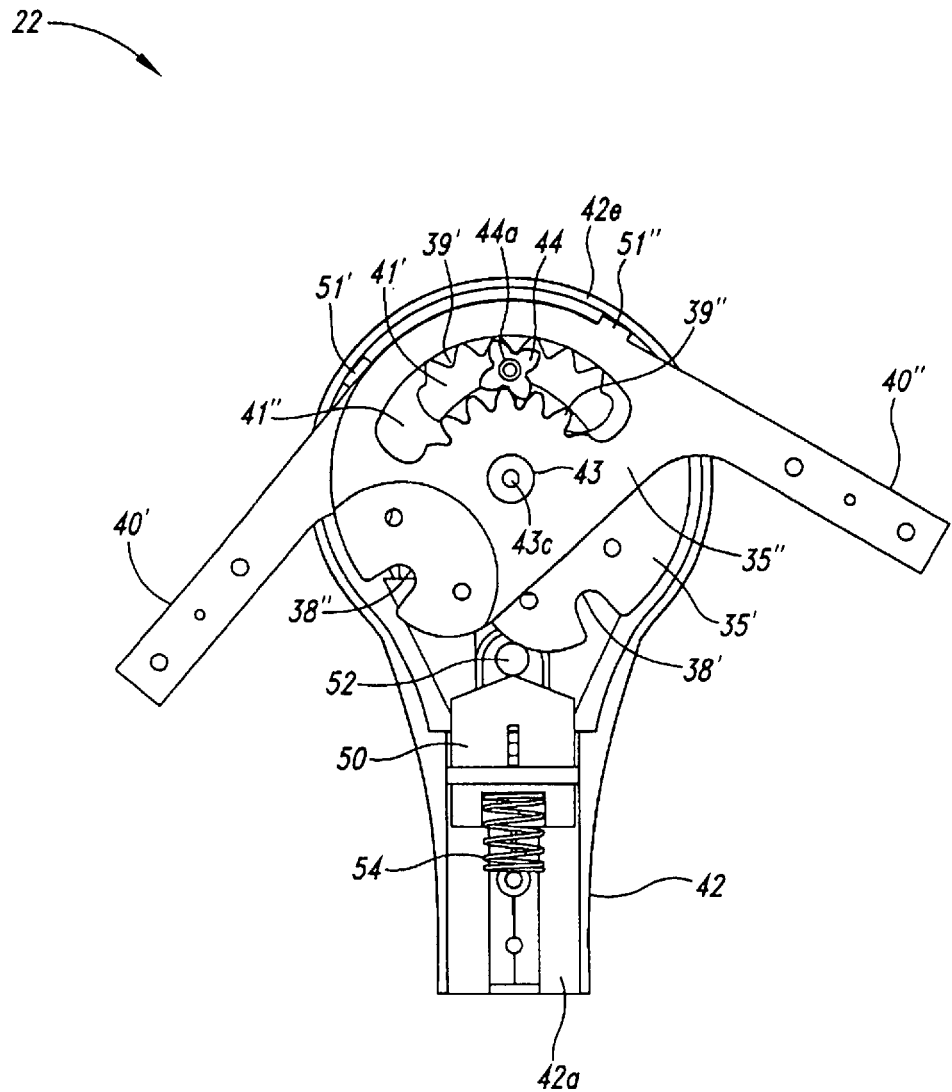
FIG. 9 is a fragmentary, left side elevational view of the right side folding assembly of FIG. 7 with its inner half housing removed and in the partially unfolded state.

The head 50 is slidably mounted in the housing 42 at a position above the recess 42a receiving the upper free-end portion 30b of the rear wheel support 30. The upper end of the spring 54 engages the head 50 and the lower end engages a spring support 56 positioned inside the upper free-end portion 30b of the rear wheel support 30. The lever 34 for the folding assembly 22 is pivotally mounted to the rear wheel support 30 and has a nose portion extending through an aperture in the head 50 and in engagement with a pin within the head so that when the lever 34 is pulled upward and inward as depicted by the arrows R1 in FIG. 3, the head 50 is moved downward, away from the disks 36' and 36", thereby causing the locking lug 52 to be retracted from the notches 38' and 38" and permitting the disks 36' and 36" to rotate toward the fully folded state shown in FIG. 6 in a generally clam shell movement to position the handle supports 24 and the front wheel supports 20 nested tightly against the rear wheel supports 30. The folding assembly 22 is shown in FIG. 9 between the unfolded and folded states with the locking lug 52 of the head 50 retracted from the notch 38' and 38".

While the spring 54 supplies enough force to the head 50 to keep the locking lug 52 in the notches 38' and 38" to lock the stroller 10 in the fully unfolded state, the force is not so great as to require undue force to be applied to the lever 34 by the user to retract locking lug from the notches when the folding assembly is to be folded.

Each of the left and right side folding assemblies 22 has the corresponding left or right front wheel support 20 bolted onto the arm 40' of the forward rotatable member 35' and the corresponding left or right handle support 24 bolted onto the arm 40" of the rearward rotatable member 35".

It should be understood that while the rotatable members 35' and 35" were depicted as including the disks 36' and 36", in other implementations the rotatable members 35' and 35" may have other shapes.

Figure 14:
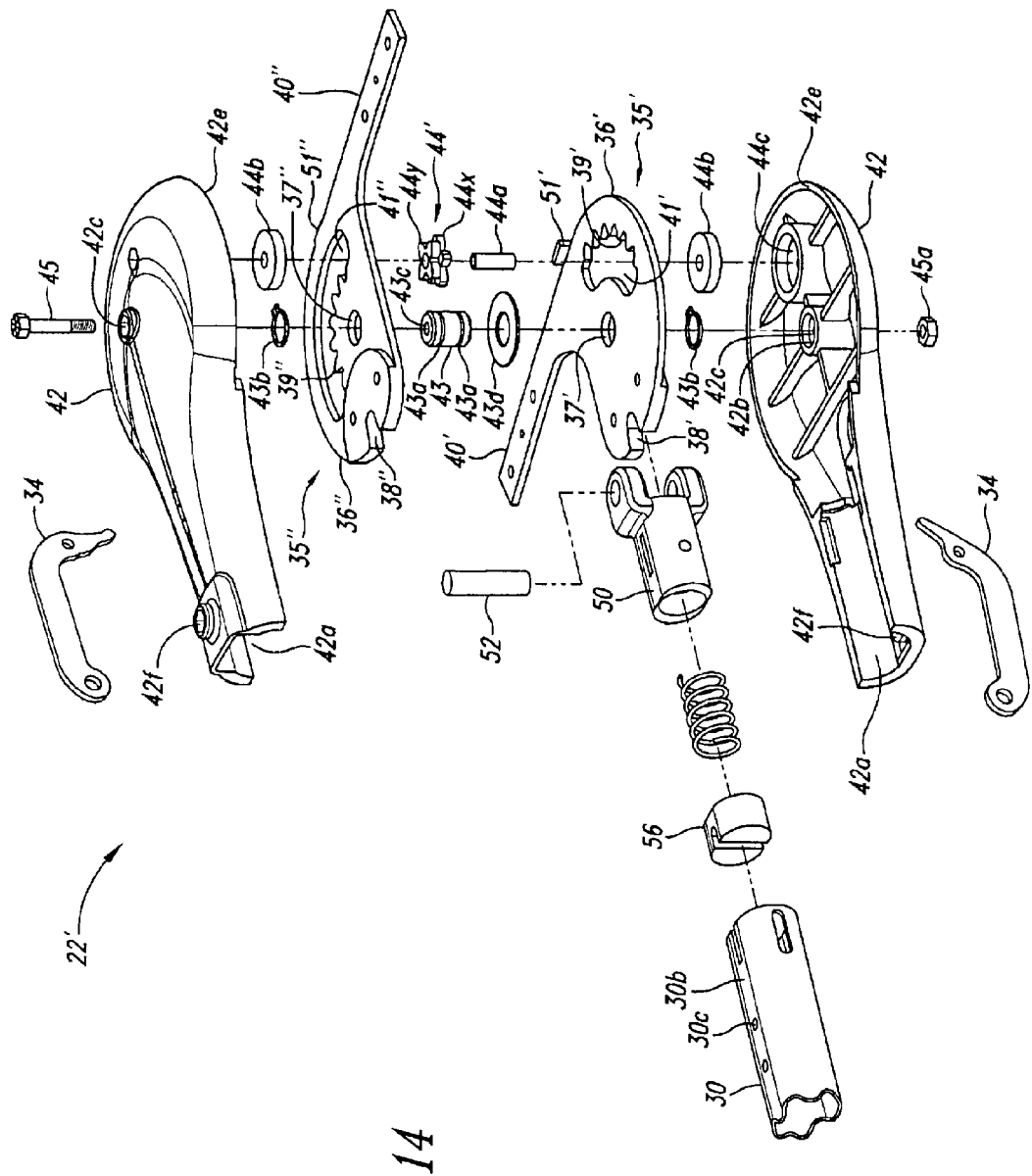
FIG. 14 is an exploded isometric view, corresponding to FIG. 7, of a center folding assembly used in a double baby stroller shown if FIG. 15 having two release levers.
Figure 15:
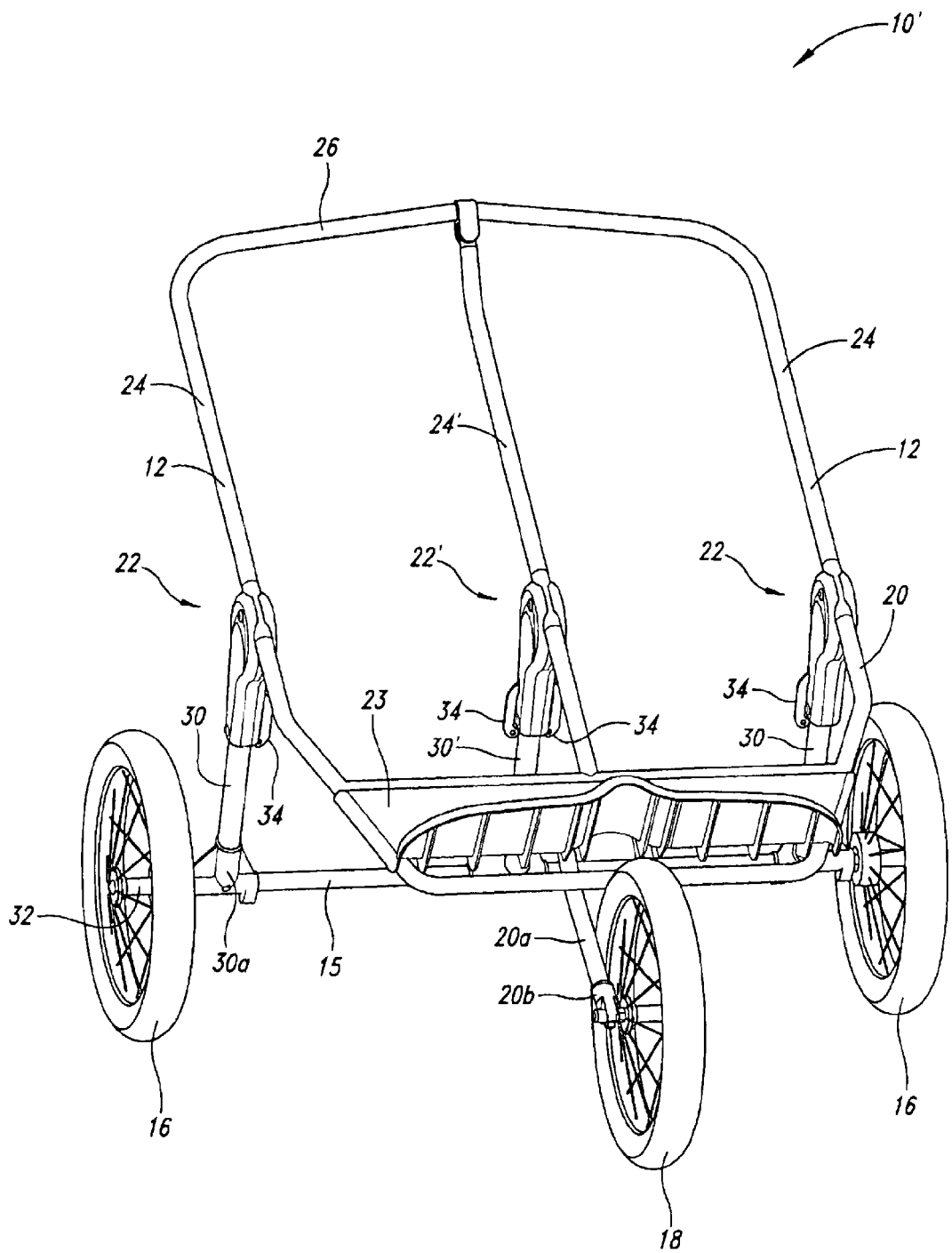
FIG. 15 is an isometric view of an exemplary implementation of a double baby stroller embodying the present invention shown in a fully unfolded state ready for usage but without a seat and a leg guard.

Another embodiment of an all-terrain baby stroller 10' is shown in FIG. 15. This embodiment has the basic same design as the stroller 10, but is designed to carry two children is side by side arrangement. The frame 12 of the stroller 10', in addition to having the left and right side frame supports 24, has a center frame support 24' which extends upward from a center folding assembly 22' (shown in FIG. 14) of the same construction as the previously described folding assemblies 22, except the center folding assembly 22' has left and right side outwardly extending levers 34. Either of the levers for the center folding assembly 22' may be pulled upward and outward to place the center folding assembly 22' in an unlocked state. Much as with the folding assembly 22 described above, each lever 34 for the center folding assembly 22' is pivotally mounted to a rear wheel support 30' and has a nose portion extending through an aperture in the head 50 of the center folding assembly 22', although from opposite sides thereof. Movement of either lever 34 when pulled upward and outward causes the head 50 of the center folding assembly 22' to moved downward, away from the disks 36' and 36" of the center folding assembly 22', thereby causing the locking lug 52 to be retracted from the notches 38' and 38" and permitting the disks 36' and 36" to rotate toward the fully folded state. A strap (not shown) may be connected by its ends to the lever 34 of the left side folding assembly 22 and to the left side lever 34 of the center folding assembly 22', and another strap (not shown) may be connected by its ends to the lever 34 of the right side folding assembly 22 and to the right side lever 34 of the center folding assembly 22' to facilitate movement of both levers to which the strap is connected at the same time.

From the foregoing it will be appreciated that, although specific embodiments of the invention have been described herein for purposes of illustration, various modifications may be made without deviating from the spirit and scope of the invention. Accordingly, the invention is not limited except as by the appended claims.

The invention claimed is:
1. A stroller, comprising:
 a first rotatable member with a first aperture having a first gear, wherein the first gear is formed at a first edge portion of the first rotatable member defining a portion of the first aperture;
 a second rotatable member with a second aperture having a second gear, wherein the second gear is formed at a second edge portion of the second rotatable member defining a portion of the second aperture; and
 a third gear positioned in driving engagement with the first gear and the second gear so that the first rotatable member and the second rotatable member rotate relative to each other in geared coordination, wherein the first edge being radially outward of an axis of the third gear and the second edge being radially inward of the axis of the third gear, wherein the first aperture is elongated and the second aperture is elongated, and wherein the elongated first and second apertures at least in part overlap.
2. The stroller of claim 1, comprising:
 a pivot member, wherein the first and second rotatable members are rotatably coupled to the pivot member to rotate about a common axis of rotation.
3. The stroller of claim 2, wherein the pivot member being configured to be supportingly engaged by one of a front wheel support, a rear wheel support and a handle member, the first rotatable member being configured to be attached to a different one of the front wheel support, rear wheel support and handle member, and the second rotatable member being configured to be attached to yet another different one of the front wheel support, rear wheel support and handle member.
4. The stroller of claim 1, wherein the first gear has a first pitch diameter and the second gear has a second pitch diameter, with the first pitch diameter and the second pitch diameter not being the same.
5. The stroller of claim 4, wherein the first pitch diameter of the first gear is sized to rotate one of a front wheel support, a rear wheel support and a handle member to which the first rotatable member is configured to be attached through a first angle of rotation from a folded position to an unfolded position, and wherein the second pitch diameter for the second gear is sized to rotate another one of the front wheel support, rear wheel support and handle member to which the second rotatable member is configured to be attached through a second angle of rotation from a folded position to an unfolded position, with the first and second angles of rotation not being the same.
6. The stroller of claim 1, wherein the first gear has a first pitch and the second gear has a second pitch different than the first pitch, and wherein the third gear includes a first gear portion with the first pitch and a second gear portion with the second pitch, the first and second portions of the third gear rotating as a unit, and the first gear portion of the third gear is positioned in the first aperture in driving engagement with the first gear and the second gear portion of the third gear is positioned in the second aperture in driving engagement with the second gear.

7. A stroller, comprising:
left and right side laterally spaced-apart handle supports, each of the handle supports having a first end portion, a second end portion, and are connected at their first ends;
left and right side laterally spaced-apart front wheel supports, each of the front wheel supports having a first end portion, a second end portion, and are at through their first ends;
left and right side laterally spaced-apart rear wheel supports, each of the third members having a first end portion, a second end portion, and are connected at their first ends; and
left and right side laterally spaced-apart folding assemblies, each of the left and right side folding assemblies having a first rotatable plate and a second rotatable plate rotatably mounted on a pivot member to pivot about a common axis in parallel planes, wherein the front wheel supports are driven to rotate relative to the rear wheel supports by movement of the handle supports.

8. The stroller of claim 7, wherein the first rotatable plate has a first aperture with a first gear and the second rotatable plate has a second aperture with a second gear, each of the left and right side folding assemblies further having a third gear positioned in both the first and second apertures such that the first gear is formed at a first edge portion of the first rotatable plate defining a portion of the first aperture and the second gear is formed at a second edge portion of the second rotatable plate defining a portion of the second aperture of each the left and right side folding assemblies, with the first edge being radially outward of the axis of the third gear and the second edge being radially inward of the axis of the third gear, such that the third gear is in driving engagement with the first gear and the second gear so that the first rotatable plate and the second rotatable plate rotate relative to each other in geared coordination.

9. The stroller of claim 8, wherein one of the second end portions of a first one of the first, second and third members being attached to the first rotatable plate, one of the second end portions of a different second one of the first, second and third members being attached to the second rotatable plate, and one of the second end portions of another different third one of the first, second and third members supporting the pivot member.

10. The stroller of claim 7, wherein the first and second rotatable plates each have a central portion with the central portions arranged in face-to-face juxtaposition.

11. The stroller of claim 7, wherein the first and second rotatable plates each have a planar arm portion projecting therefrom and in coplanar relation therewith, the one of the second end portions attached to the first rotatable plate being attached to the arm portion thereof and the one of the second end portions attached to the second rotatable plate being attached to the arm thereof.

12. The stroller of claim 8, wherein the first gear has a first pitch diameter and the second gear has a second pitch diameter, with the first pitch diameter and the second pitch diameter not being the same.

13. The stroller of claim 12, wherein the first pitch diameter of the first gear is sized to rotate the one of the first, second and third members attached to the first rotatable plate through a first angle of rotation from a folded position to an unfolded position, and wherein the second pitch diameter for the second gear is sized to rotate the one of the first, second and third members attached to the second rotatable plate through a second angle of rotation from a folded position to an unfolded position, with the first and second angles of rotation not being the same.

14. The stroller of claim 8, wherein the first and second rotatable plates are rotatably mounted to rotate about the common axis through spaced apart parallel rotation planes with the common axis transverse to the first and second rotatable plates, and the third gear is rotatably mounted to rotate about an axis transverse to the rotation planes of the first and second rotatable plates and spaced apart from the common axis of the first and second rotatable plates.

15. The stroller of claim 14, wherein the first and second rotatable plates each have a planar arm portion projecting therefrom and in coplanar relation therewith and rotatable with the first and second rotatable plates through the respective spaced apart parallel rotation planes of the first and second rotatable plates, the one of the second end portions attached to the first rotatable plate being attached to the arm portion thereof and the one of the second end portions attached to the second rotatable plate being attached to the arm thereof.

16. The stroller of claim 8, wherein the third gear is rotatably mounted to rotate about an axis parallel to and spaced apart from the common axis of the first and second rotatable plates.

17. The stroller of claim 16, wherein the first and second rotatable plates are rotatably mounted to rotate about the common axis with the first and second gears being in parallel rotation planes.

18. The stroller of claim 7, wherein the handle supports rotate about 108° and the front wheel supports are driven to rotate about 72° from the folded position to the unfolded position.

* * * * *